(12) United States Patent
Liu et al.

(10) Patent No.: US 11,409,270 B1
(45) Date of Patent: Aug. 9, 2022

(54) OPTIMIZATION DECISION-MAKING METHOD OF INDUSTRIAL PROCESS FUSING DOMAIN KNOWLEDGE AND MULTI-SOURCE DATA

(71) Applicant: INSTITUTE OF AUTOMATION, CHINESE ACADEMY OF SCIENCES, Beijing (CN)

(72) Inventors: Chengbao Liu, Beijing (CN); Jie Tan, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/560,878

(22) Filed: Dec. 23, 2021

(30) Foreign Application Priority Data

Feb. 18, 2021  (CN) .......................... 202110186760.6

(51) Int. Cl.
  *G06N 5/02* (2006.01)
  *G06N 5/04* (2006.01)
  *G05B 19/418* (2006.01)
(52) U.S. Cl.
  CPC ....... *G05B 19/41885* (2013.01); *G06N 5/025* (2013.01); *G06N 5/042* (2013.01)
(58) Field of Classification Search
  CPC .............................. G06N 5/025; G06N 5/042
  See application file for complete search history.

(56) References Cited

U.S. PATENT DOCUMENTS

2017/0199928 A1* 7/2017 Zhao ................... G06F 16/3329

FOREIGN PATENT DOCUMENTS

| CN | 105975977 A |   | 9/2016  |
|----|-------------|---|---------|
| CN | 108804715 A |   | 11/2018 |
| CN | 108960419 A |   | 12/2018 |
| CN | 109902165 A |   | 6/2019  |
| CN | 111026877 A | * | 4/2020  |
| CN | 111026877 A |   | 4/2020  |
| CN | 112348190 A |   | 2/2021  |

OTHER PUBLICATIONS

First Office Action issued in counterpart Chinese Patent Application No. 202110186760.6, dated Mar. 29, 2021.

* cited by examiner

*Primary Examiner* — Paulinho E Smith
(74) *Attorney, Agent, or Firm* — Westbridge IP LLC (57) ABSTRACT

Disclosed is an optimization decision-making method of an industrial process fusing domain knowledge and multi-source data. The method comprises the steps of: acquiring the domain knowledge of the industrial process by using probability soft logic, and building an domain rule knowledge base of the industrial process; fusing multi-source data semantics and multi-source data features to form a new semantic knowledge representation of the industrial process, and constructing a semantic knowledge base of the industrial process; under a posteriori regularization framework, utilizing the domain rule knowledge base of the industrial process and the semantic knowledge base of the industrial process to obtain an optimization decision-making model embedded with the domain rule knowledge and obtain a posteriori distribution model; and migrating knowledge in the optimization decision-making model embedded with the domain rule knowledge into the posteriori distribution model through the knowledge distillation technology.

7 Claims, 5 Drawing Sheets

OPTIMIZATION DECISION-MAKING METHOD OF INDUSTRIAL PROCESS FUSING DOMAIN KNOWLEDGE AND MULTI-SOURCE DATA

CROSS-REFERENCE TO RELATED APPLICATIONS

The present disclosure claims the priority to the Chinese Patent Application CN202110186760.6 entitled "Optimization decision-making method of an industrial process fusing domain knowledge and multi-source data" filed on Feb. 18, 2021, the entire content of which is incorporated herein by reference.

FIELD OF THE INVENTION

The present disclosure relates to a field of artificial intelligence, and in particular, to an optimization decision-making method of an industrial process fusing domain knowledge and multi-source data.

BACKGROUND OF THE INVENTION

A complex industrial manufacturing process is a multi-scale dynamic system involving the collaborative interaction of complex production factors such as people, equipment, material, technology and environment, the optimization decision-making problem of which is generally in complex coupling association with diversified dynamic production factors and possesses features in complex mechanism, multi-objective and multi-constraint, multi-scale dynamic optimization, and the like, causing considerable difficulties to its solution.

As new technologies such as Internet of things, cloud computing and mobile Internet have been increasingly widely used, the types and scales of data in industrial environment increase rapidly and accumulate to form big data of the industrial process, and possess features in high sampling frequency, high information density, multi-source heterogeneity and multi-space and time distribution, and the like, which contains rich innovative knowledge and represents a dynamic variation laws and a potential model of the optimization decision-making process.

Meanwhile, there are also long-term accumulated experience and knowledge of engineers, operators and domain experts, mechanism knowledge of an internal change represented by a differential equation or a chemical equation and process specifications formulated for different processes in the production process, and the like in the industrial process. Such diverse domain knowledge reflects a general description and a common rule of the production factors. It is a core requirement of intelligentizing the production of the manufacturing industry to effectively use the rich knowledge and the diverse domain knowledge contained in the big data of a manufacturing process, to construct an automation system for optimization decision-making knowledge of a complex industrial process and to promote artificial intelligence technology to realize automation of knowledge-based work in intelligent manufacturing.

SUMMARY OF THE INVENTION

In order to solve the above technical problems or at least partially solve the above technical problems, the present disclosure provides an optimization decision-making method of an industrial process fusing the domain knowledge and the multi-source data, the method including:

S1: acquiring the domain knowledge of the industrial process by using probability soft logic, and building a domain rule knowledge base of the industrial process;

S2: fusing multi-source data semantics and multi-source data features to form a new semantic knowledge representation of the industrial process, and constructing a semantic knowledge base of the industrial process;

S3: under a posteriori regularization framework, utilizing the domain rule knowledge base of the industrial process and the semantic knowledge base of the industrial process to obtain an optimization decision-making model embedded with domain rule knowledge and obtain a posteriori distribution model; and S4: migrating knowledge in the optimization decision-making model embedded with the domain rule knowledge into the posteriori distribution model through the knowledge distillation technology.

According to an embodiment of the present disclosure, the specific steps of acquiring the domain knowledge of the industrial process by using the probability soft logic include:

S11: expressing properties, states, attributes and correlations therebetween of different production factors in a manufacturing process by using an N-ary predicate so as to construct a first-order logic rule;

S12: defining a weighted first-order logic rule to express the relationship between an optimization decision-making problem and the cause of the optimization decision-making problem; and S13: performing weight learning by using the probability soft logic to acquire the domain rule knowledge of the industrial process.

According to an embodiment of the present disclosure, a specific formula of the weighted first-order logic rule is $$\forall D_1, D_2, \ldots, D_l, R. P_1(D_1, \ldots) \wedge P_2(D_2, \ldots) \wedge \ldots \wedge P_l(D_l, \ldots) \Rightarrow P_R(Q,R) : \lambda,$$

where P1, P2, Pl, PR are predicates; D1, D2, Dl, R are variables; $\lambda$ represents the weight. The weight indicates an importance of the first-order logic rule. That is, the larger the weight, the more important the first-order logic rule is. A specific value of the weight is a non-negative real number. Such rule indicates that the states of industrial process targets D1, D2, ..., Dl in a certain condition cause the result of the optimization decision-making problem Q is R.

According to an embodiment of the present disclosure, a specific expression form of the domain rule knowledge base of the industrial process is $K_R = \{(r_i, \lambda_i)\}_{i=1}^m$, where m represents a size of the domain rule knowledge base, ri represents an i-th first-order logic rule, and $\lambda_i$ is the weight of a corresponding first-order logic rule.

According to an embodiment of the present disclosure, the step of acquiring the multi-source data semantics includes:

S21: clustering the multi-source data by an unsupervised clustering method to extract the multi-source data semantics; and the step of acquiring the multi-source data features includes:

S22: preforming feature extraction on the multi-source data by using a convolution self-encoder.

According to an embodiment of the present disclosure, a specific form of the new semantic knowledge representation of the industrial process is $k = h_A : R$, where the first half is a fusing feature hA and $h_A = (H_1, H_2, \ldots, H_N) : \{A_1, A_2, \ldots, A_N\}$; and R is decision-making semantics corresponding to the fusing feature hA, and R represents a specific decision-making result of the optimization decision-making problem. Further, $(H_1, H_2, \ldots, H_N)$ is a feature of compact optimization for the multi-source data $(X_1, X_2, \ldots, X_N)$; and $\{A_1, A_2, \ldots, A_N\}$ is the semantics of the multi-source data $(X_1, X_2, \ldots, X_N)$.

According to an embodiment of the present disclosure, a specific expression form of the semantic knowledge base of the industrial process is $K_S = \{k_i\}_{i=1}^n$, where n represents a size of the semantic knowledge base, and ki represents an i-th knowledge element.

According to an embodiment of the present disclosure, the specific steps of obtaining the optimization decision-making model embedded with the domain rule knowledge and obtaining the posteriori distribution model include:

S31: defining a mapping relation by $\phi_i: \{r_{il}(X, Y)\}_{l=1}^L \to \mathbb{R}$ by using the domain rule knowledge base $K_R = \{(r_i, \lambda_i)\}_{i=1}^m$ of the industrial process to encode the domain knowledge of the industrial process;

S32: under the posteriori regularization framework, introducing $\phi_i: \{r_{il}(X,Y)\}_{l=1}^L \to \mathbb{R}$ in the form of constraints into a learning process of the model, converting the optimization decision-making problem thereof into a constraint-optimization problem, $$\min_{q \in Q, \xi \geq 0} f(X, Y) - C \sum_i \xi_i$$

$$\text{s.t. } \lambda_i E_q[\phi_i(X, Y)] \leq \xi_i, i = 1, \ldots, m$$

where C, $\lambda_i$ and $\xi_i$ are constants; $KL(q(Y|X) \| p_\theta(Y|X))$ is a form of $f(X,Y)$ under the posteriori regularization framework; and $KL(\bullet)$ is a divergence calculation; and S33: obtaining an optimization decision-making knowledge inference model embedded with the domain rule knowledge of the industrial process by solving the constraint-optimization problem;

$$q(Y|X) = \frac{1}{Z} p_\theta(Y|X) \exp\left\{ C \sum_i \lambda_i \phi_i(X, Y) \right\}$$

$$Z = \sum_Y p_\theta(Y|X) \exp\left\{ C \sum_i \lambda_i \phi_i(X, Y) \right\}$$

where $q(Y|X)$ represents the optimization decision-making model embedded with the domain rule knowledge, and $P\theta(Y|X)$ is the posteriori distribution model.

According to an embodiment of the present disclosure, the specific steps of migrating knowledge in the optimization decision-making model embedded with the domain rule knowledge into the posteriori distribution model include:

S41: defining the optimization decision-making model $q(Y|X)$ embedded with the domain rule knowledge as a teacher network, and defining the posteriori distribution model $p_\theta(Y|X)$ established by the multi-source data semantics as a student network;

S42: training the teacher network and the student network simultaneously by using the domain rule knowledge base KR of the industrial process and the semantic knowledge base KS of the industrial process, where a parameter $\theta$ is updated as follows:

$$\theta^{t+1} = \arg\min_{\theta \in \Theta} \frac{1}{n} \sum_{i=1}^n [(1-\pi) loss(c_R^i, \sigma_\theta) + \pi loss(s_t^i, \sigma_\theta)]$$

where $loss(\bullet)$ is a loss function; $\sigma_\theta$ is a soft output of the student network $p_{74}(Y|X)$; $S_t^i$ is a soft output of the teacher network $q(Y|X)$; and $C_R^i$ is a real decision-making semantics; and performing iteration training of a teacher-student network by using formulas $$q(Y|X) = \frac{1}{Z} p_\theta(Y|X) \exp\left\{ C \sum_i \lambda_i \phi_i(X, Y) \right\}$$

$$Z = \sum_Y p_\theta(Y|X) \exp\left\{ C \sum_i \lambda_i \phi_i(X, Y) \right\}$$

and the formula $$\theta^{t+1} = \arg\min_{\theta \in \Theta} \frac{1}{n} \sum_{i=1}^n [(1-\pi) loss(c_R^i, \sigma_\theta) + \pi loss(s_t^i, \sigma_\theta)]$$

so as to migrate the knowledge from the teacher network to the student network.

According to an embodiment of the present disclosure, a specific form of the loss function $loss(\bullet)$ may be chosen as follows:

when solving a classification problem, the loss function of a cross-entropy $$loss(y, \hat{y}) = -\frac{1}{n} \sum_{i=1}^n [y \ln \hat{y} + (1-y) \ln(1 - \hat{y})]$$

may be chosen, where y is a real value, and $\hat{y}$ is a prediction value; and when solving a regression problem, the loss function of square $$loss(y, \hat{y}) = \frac{1}{2n} \sum_{i=1}^n \|(y - \hat{y})\|_2^2$$

may be chosen, where y is a real value, and $\hat{y}$ is a prediction value.

The above technical solutions provided by the embodiment of the present disclosure have following advantages over the prior art.

In the method provided by the invention, firstly, the unstructured domain knowledge such as the expert experience, the mechanism knowledge and the process specification is expressed by using the weighted first-order logic rule and the probability soft logic. That is, the domain rule knowledge is represented by the formula $\forall D_1, D_2, \ldots, D_I, R.P_1(D_1, \ldots) \wedge P_2(D_2, \ldots) \wedge \ldots \wedge P_I(D_I, \ldots) \Rightarrow P_R(Q,R):\lambda$ so as to provide support to the intelligent inference of the optimization decision-making for the computer; secondly, the method of the present disclosure provides a new form of knowledge representation as shown by the formula $k = (H_1, H_2, \ldots, H_N):\{A_1, A_2, \ldots, A_N\}:R$, which enables compact expression of the massive multi-source data of the industrial process, gives feature semantics to each multi-source data, and converts the multi-source data into knowledge containing the semantics information, so as to provide support to the optimization decision-making of the industrial process; and then building the optimization decision-making model embedded with the domain rule knowledge of the industrial process by using the built domain rule knowledge base and the semantic knowledge base of the industrial process, which enables effectively combination of the domain knowledge and the multi-source data semantic knowledge so as to drive the optimization decision-making of the industrial process collaboratively, accurately reveals the internal mechanism and evolutionary characteristics of the optimization decision-making, and achieves knowledge automation of the optimization decision-making of the industrial process.

Further, the method of the present disclosure provides a feasible solution to compression of the optimization decision-making knowledge inference model embedded with the domain rule knowledge, may obtain an equivalent lightweight model, and provides a real-time online optimization for the optimization decision-making problem of the industrial process.

In addition, the present disclosure provides a solution framework for solving the optimization decision-making problem by combining the domain knowledge with the industrial big data, effectively uses the unstructured domain knowledge of the industrial process and massive data generated by sensor networks, enhances robustness and accuracy of solving the optimization decision-making problem, and lays a solid foundation for the knowledge automation of the industrial process.

BRIEF DESCRIPTION OF THE DRAWINGS

The accompanying drawings herein, which are incorporated in and constitute a part of this specification, illustrate embodiments according to the present disclosure and together with the specification serve to explain the inventive principles.

For the purpose of more clearly illustrating the embodiments of the present disclosure or the technical solution in the prior art, a brief description of the accompanying drawings to be used in describing the embodiments or the prior art is given below. It is obvious for ordinary persons skilled in the art to obtain other accompanying drawings from these accompanying drawings without any inventive effort.

DETAILED DESCRIPTION OF THE EMBODIMENTS

For the purpose of making the objects, technical solutions and advantages of the present disclosure clearer, the technical solutions in the embodiments of the present disclosure will be described clearly and completely below in conjunction with the accompanying drawings of embodiment of the invention. Obviously, the described embodiments are a part of the embodiments of the invention, and not all of the embodiments of the invention. Based on the embodiments of the invention, all other embodiments obtained by ordinary persons skilled in the art without inventive work fall within the protective scope of the invention.

Figure 2:
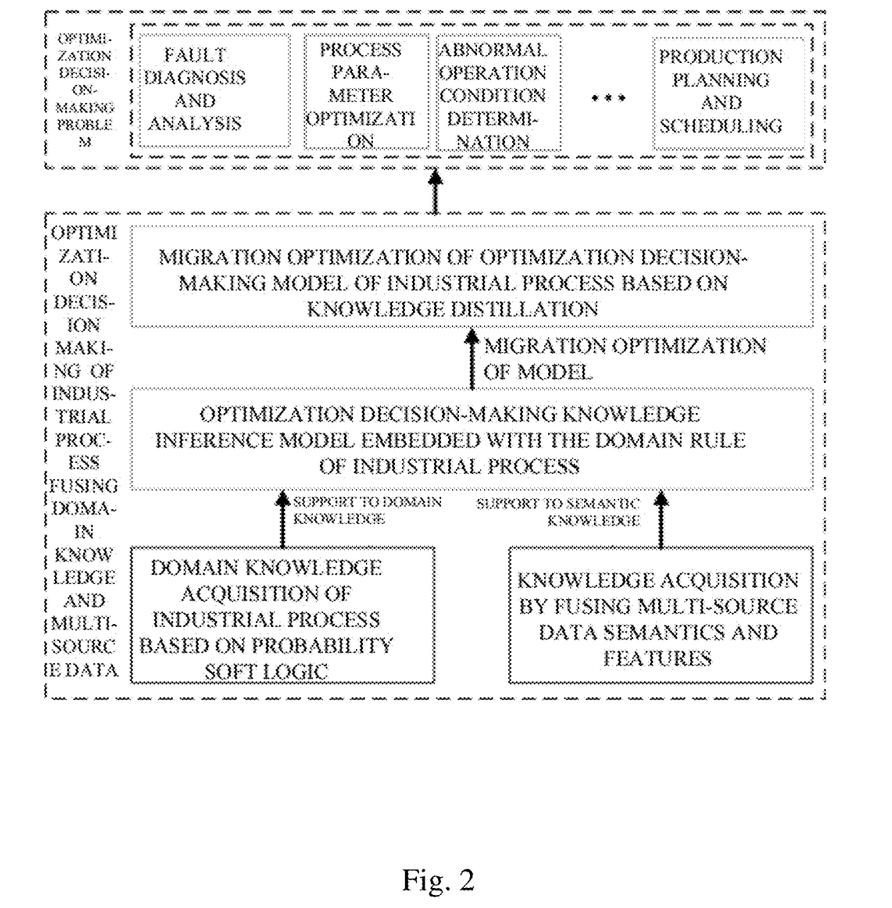
FIG. 2 is a block diagram illustrating a structure of the optimization decision-making method of the industrial process fusing the domain knowledge and the multi-source data according to an exemplary embodiment.

As shown in FIG. 2, the optimization decision-making method of the industrial process fusing the domain knowledge and the multi-source data is provided for the optimization decision-making problems such as production planning and scheduling, fault diagnosis and analysis, process parameter optimization, abnormal operation condition determination, and the like existing in the activities of a full life circle of the industrial process. Specifically, the method includes 4 modules of, namely, domain knowledge acquisition of the industrial process based on the probability soft logic, knowledge acquisition by fusing the multi-source data semantics and features, optimization decision-making knowledge inference model embedded with the domain rule knowledge of the industrial process and migration optimization of the optimization decision-making model of the industrial process based on knowledge distillation. Among them, the module of domain knowledge acquisition of the industrial process based on the probability soft logic mainly acquires the unstructured domain knowledge of the industrial process so as to form the domain rule knowledge base; the module of knowledge acquisition by fusing the multi-source data semantics and the features mainly extracts knowledge with innovative value contained in the massive multi-source data of the industrial process so as to form the semantic knowledge base; the module of optimization decision-making knowledge inference model embedded with the domain rule knowledge of the industrial process mainly uses the domain rule knowledge base and the semantic knowledge base to build the optimization decision-making knowledge inference model so as to solve the optimization decision-making problems such as the production planning and scheduling, the fault diagnosis and analysis, the process parameter optimization, the abnormal operation condition determination, and the like; and the module of migration optimization of the optimization decision-making model of the industrial process based on knowledge distillation mainly performs migration optimization of the built optimization decision-making knowledge inference model to obtain the equivalent lightweight model to facilitate the online application of the industrial process.

Figure 1:
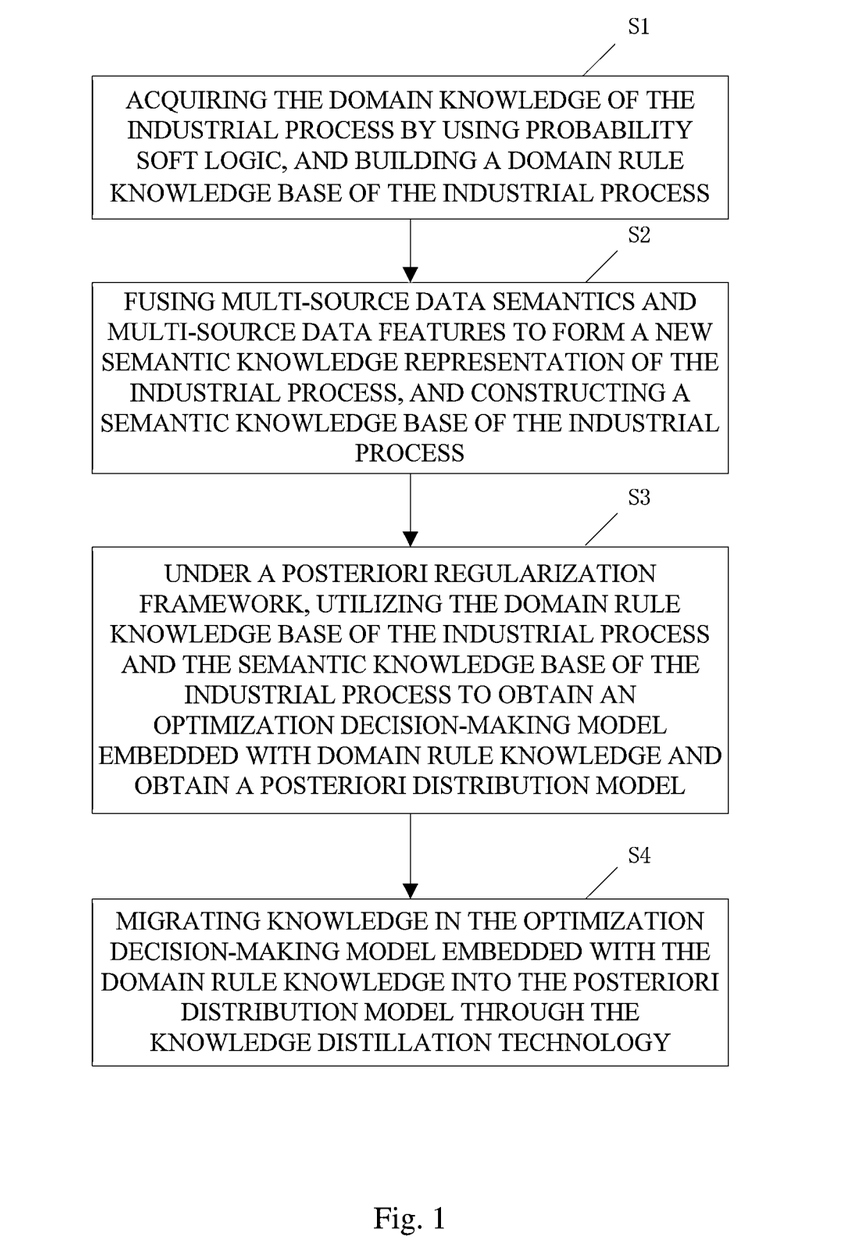
FIG. 1 is a flow chart of an optimization decision-making method of an industrial process fusing domain knowledge and multi-source data provided by the embodiment of the invention.

FIG. 1 is a flow chart of an optimization decision-making method of an industrial process fusing domain knowledge and multi-source data provided by the embodiment of the invention, and the method includes:

S1: acquiring the domain knowledge of the industrial process by using probability soft logic, and building a domain rule knowledge base of the industrial process;

S2: fusing multi-source data semantics and multi-source data features to form a new semantic knowledge representation of the industrial process, and constructing a semantic knowledge base of the industrial process;

S3: under a posteriori regularization framework, utilizing the domain rule knowledge base of the industrial process and the semantic knowledge base of the industrial process to obtain an optimization decision-making model embedded with domain rule knowledge and obtain a posteriori distribution model; and S4: migrating knowledge in the optimization decision-making model embedded with the domain rule knowledge into the posteriori distribution model through the knowledge distillation technology.

Figure 4:
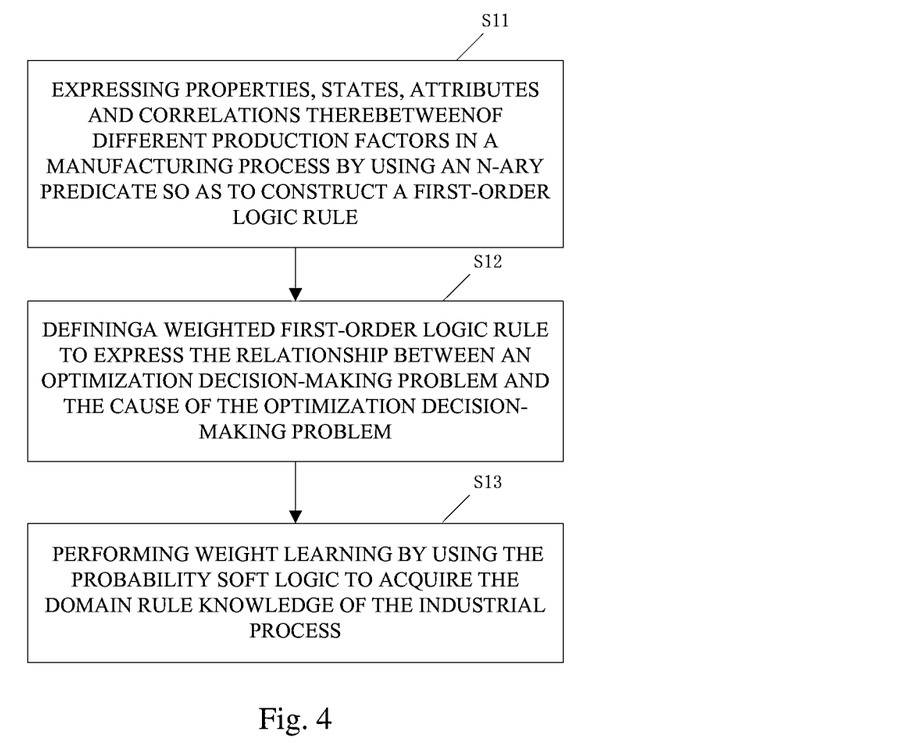
FIG. 4 is a flow chart of the specific steps of acquiring the domain knowledge of the industrial process by using the probability soft logic.

Further, as shown in FIG. 4, based on the above solution, the specific steps of acquiring the domain knowledge of the industrial process by using the probability soft logic include:

S11: expressing properties, states, attributes and correlations therebetween of different production factors in a manufacturing process by using an N-ary predicate so as to construct a first-order logic rule;

S12: defining a weighted first-order logic rules to express the relationship between an optimization decision-making problem and the cause of the optimization decision-making problem; and S13: performing weight learning by using the probability soft logic to acquire the domain rule knowledge of the industrial process.

Further, based on the above solution, a specific formula of the weighted first-order logic rule is $$\forall D_1, D_2, \ldots, D_l, R.P_1(D_1, \ldots) \wedge P_2(D_2, \ldots) \wedge \ldots \wedge P_l(D_l, \ldots) \Rightarrow P_R(Q,R): \lambda$$

where $P_1$, $P_2$, $P_l$, $P_R$ are predicates; $D_1$, $D_2$, $D_l$, R are variables; $\lambda$ represents the weight. The weight indicates an importance of the first-order logic rule. That is, the larger the weight, the more important the first-order logic rule is. The specific value of the weight is a non-negative real number. Such rule indicates that the states of industrial process targets $D_1, D_2, \ldots, D_l$ in a certain condition cause the result of the optimization decision-making problem Q is R.

Further, based on the above solution, a specific expression form of the domain rule knowledge base of the industrial process is $K_R = \{(r_i, \lambda_i)\}_{i=1}^m$, where m represents a size of the domain rule knowledge base, $r_i$ represents an i-th first-order logic rule, and $\lambda_i$ is the weight of a corresponding first-order logic rule.

Figure 5:
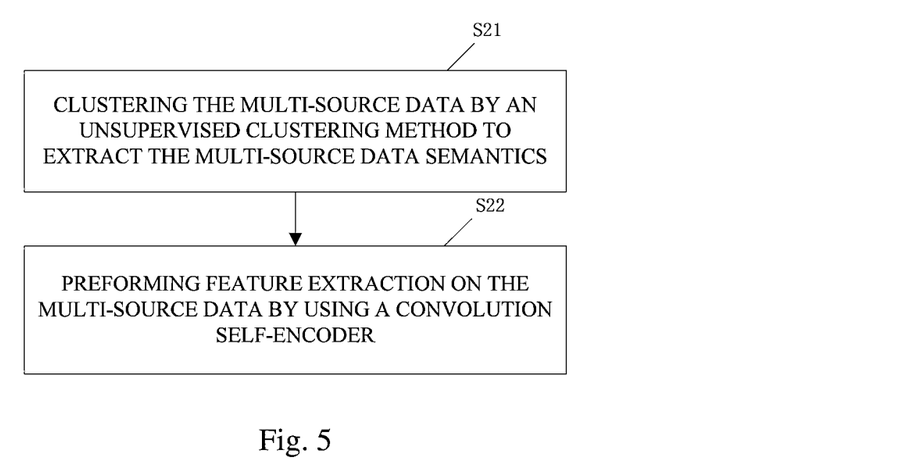
FIG. 5 is a flow chart of the steps of acquiring the multi-source data semantics and the multi-source data features.

Further, as shown in FIG. 5, based on the above solution, the step of acquiring the multi-source data semantics includes:

S21: clustering the multi-source data by an unsupervised clustering method to extract the multi-source data semantics; and the step of acquiring the multi-source data features includes:

S22: preforming feature extraction on the multi-source data by using a convolution self-encoder.

Further, based on the above solution, a specific form of the new semantic knowledge representation of the industrial process is $k = h_A : R$, where the first half is a fusing feature $h_A$ $h_A = (H_1, H_2, \ldots, H_N): \{A_1, A_2, \ldots, A_N\}$; and R is decision-making semantics corresponding to the fusing feature $h_A$, and R generally represents a specific decision-making result of the decision-making problem. Further, $(H_1, H_2, \ldots, H_N)$ is a feature of compact optimization for the multi-source data $(X_1, X_2, \ldots, X_N)$; and $\{A_1, A_2, \ldots, A_N\}$ is the semantics of the multi-source data $(X_1, X_2, \ldots, X_N)$.

Further, based on the above solution, a specific expression form of the semantic knowledge base of the industrial process is $K_S = \{k_i\}_{i=1}^n$, where n represents a size of the semantic knowledge base, and $k_i$ represents an i-th knowledge element.

Generally, the domain knowledge of the industrial process reflects natural variation laws of the optimization decision-making process, while the knowledge implied by the multi-source data reflects dynamic variation laws of the manufacturing process. The internal mechanism and evolutionary characteristics of the optimization decision-making problem of the industrial process may be accurately revealed by effectively combining the domain knowledge and the innovative knowledge implied by the multi-source data.

Figure 6:
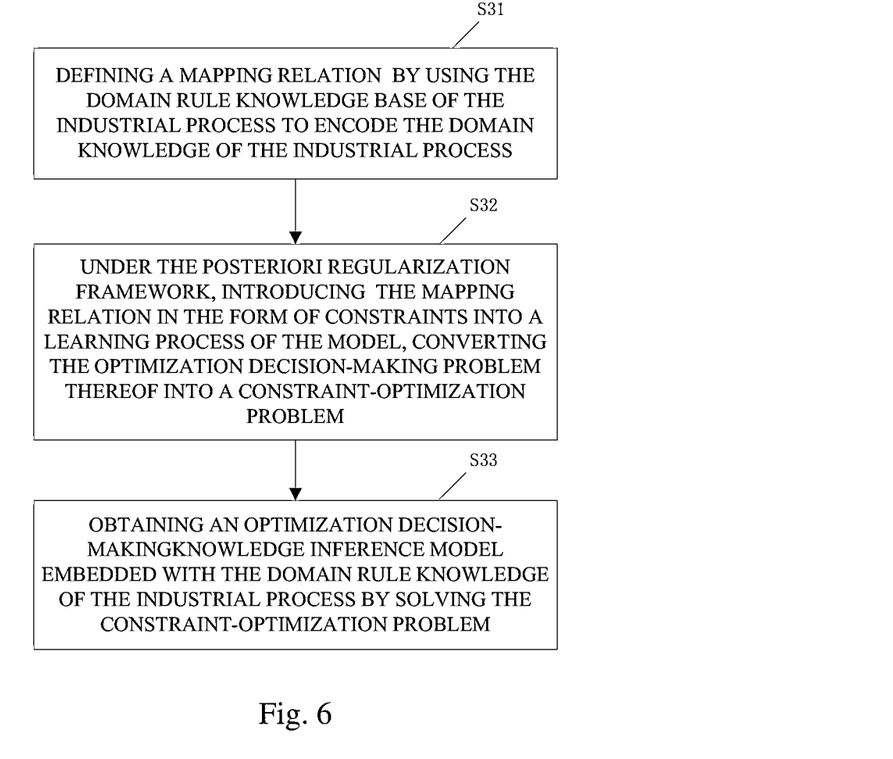
FIG. 6 is a flow chart of the specific steps of obtaining the optimization decision-making model embedded with the domain rule knowledge and obtaining the posteriori distribution model.

Further, as shown in FIG. 6, based on the above solution, the specific steps of obtaining the optimization decision-making model embedded with the domain rule knowledge and obtaining the posteriori distribution model include:

S31: defining a mapping relation by $\phi_i: \{r_{il}(X,Y)\}_{l=1}^L \to \mathbb{R}$ by using the domain rule knowledge base $K_R = \{(r_i, \lambda_i)\}_{i=1}^m$ of the industrial process to encode the domain knowledge of the industrial process;

S32: under the posteriori regularization framework, introducing $\phi_i: \{r_{il}(X,Y)\}_{l=1}^L \to \mathbb{R}$ in the form of constraints into a learning process of the model, converting the optimization decision-making problem thereof into a constraint-optimization problem, $$\min_{q \in Q, \xi \geq 0} f(X,Y) - C \sum_i \xi_i$$

$$\text{s.t. } \lambda_i E_q[\phi_i(X,Y)] \leq \xi_i, i = 1, \ldots m;$$

where C, $\lambda_i$ and $\xi_i$ are constants; $KL(q(Y|X) \| p_\theta(Y|X))$ is a form of $f(X,Y)$ under the posteriori regularization framework; and $KL(\bullet)$ is a divergence calculation; and S33: obtaining an optimization decision-making knowledge inference model embedded with the domain rule knowledge of the industrial process by solving the constraint-optimization problem;

$$q(Y|X) = \frac{1}{Z} p_\theta(Y|X) \exp\left\{C \sum_i \lambda_i \phi_i(X,Y)\right\}$$

$$Z = \sum_Y p_\theta(Y|X) \exp\left\{C \sum_i \lambda_i \phi_i(X,Y)\right\}$$

where $q(Y|X)$ represents the optimization decision-making model embedded with the domain rule knowledge, and $p_\theta(Y|X)$ is the posteriori distribution model.

Figure 7:
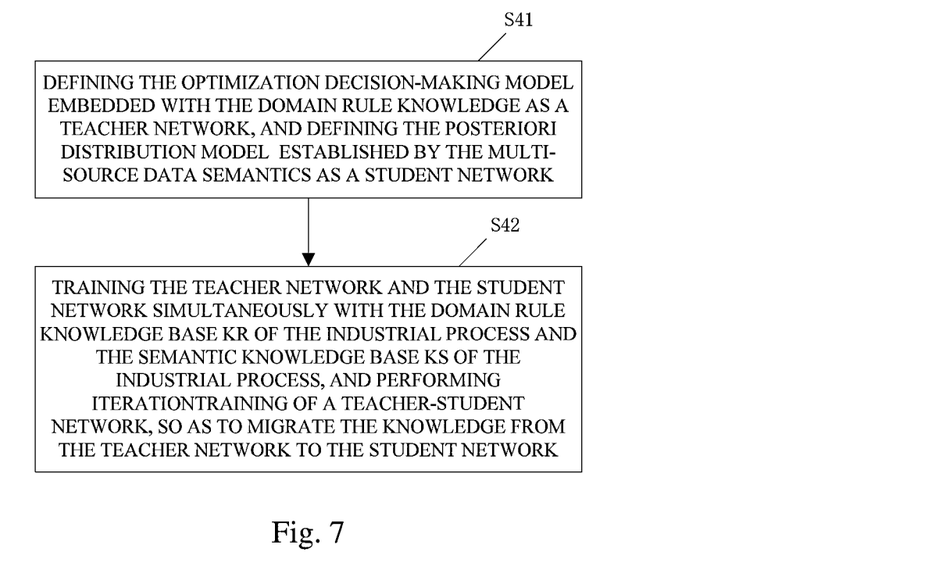
FIG. 7 is a flow chart of the specific steps of migrating knowledge in the optimization decision-making model embedded with the domain rule knowledge into the posteriori distribution model.

Further, as shown in FIG. 7, based on the above solution, the specific steps of migrating knowledge in the optimization decision-making model embedded with the domain rule knowledge into the posteriori distribution model include:

S41: defining the optimization decision-making model $q(Y|X)$ embedded with the domain rule knowledge as a teacher network, and defining the posteriori distribution model $p_\theta(Y|X)$ established by the multi-source data semantics as a student network;

S42: training the teacher network and the student network simultaneously with the domain rule knowledge base $K_R$ of the industrial process and the semantic knowledge base $K_S$ of the industrial process, where a parameter θ is updated as follows:

$$\theta^{t+1} = \underset{\theta \in \Theta}{\mathrm{argmin}} \frac{1}{n} \sum_{i=1}^{n} [(1-\pi)\mathrm{loss}(c_R^i, \sigma_\theta) + \pi \mathrm{loss}(s_i^t, \sigma_\theta)]$$

where loss(•) is a loss function; $\sigma_\theta$ is a soft output of the student network $p_\theta(Y|X)$; $S_i^t$ is a soft output of the teacher network $q(Y|X)$; and $C_R^i$ is a real decision-making semantics; and performing iteration training of a teacher-student network by using the formula $$q(Y|X) = \frac{1}{Z} p_\theta(Y|X) \exp\left\{C \sum_i \lambda_i \phi_i(X, Y)\right\}$$

$$Z = \sum_Y p_\theta(Y|X) \exp\left\{C \sum_i \lambda_i \phi_i(X, Y)\right\}$$

and the formula $$\theta^{t+1} = \underset{\theta \in \Theta}{\mathrm{argmin}} \frac{1}{n} \sum_{i=1}^{n} [(1-\pi)\mathrm{loss}(c_R^i, \sigma_\theta) + \pi \mathrm{loss}(s_i^t, \sigma_\theta)]$$

so as to migrate the knowledge from the teacher network to the student network.

Further, based on the above solution, a specific form of the loss function loss(•) may be chosen as follows:

when solving a classification problem, the loss function of a cross-entropy $$\mathrm{loss}(y, \hat{y}) = -\frac{1}{n} \sum_{i=1}^{n} [y \ln \hat{y} + (1-y)\ln(1-\hat{y})]$$

may be chosen, where y is a real value, and ŷ is a prediction value; and when solving a regression problem, the loss function of square $$\mathrm{loss}(y, \hat{y}) = \frac{1}{2n} \sum_{i=1}^{n} \|(y - \hat{y})\|_2^2$$

may be chosen, where y is a real value, and ŷ is a prediction value.

Embodiments

Figure 3:
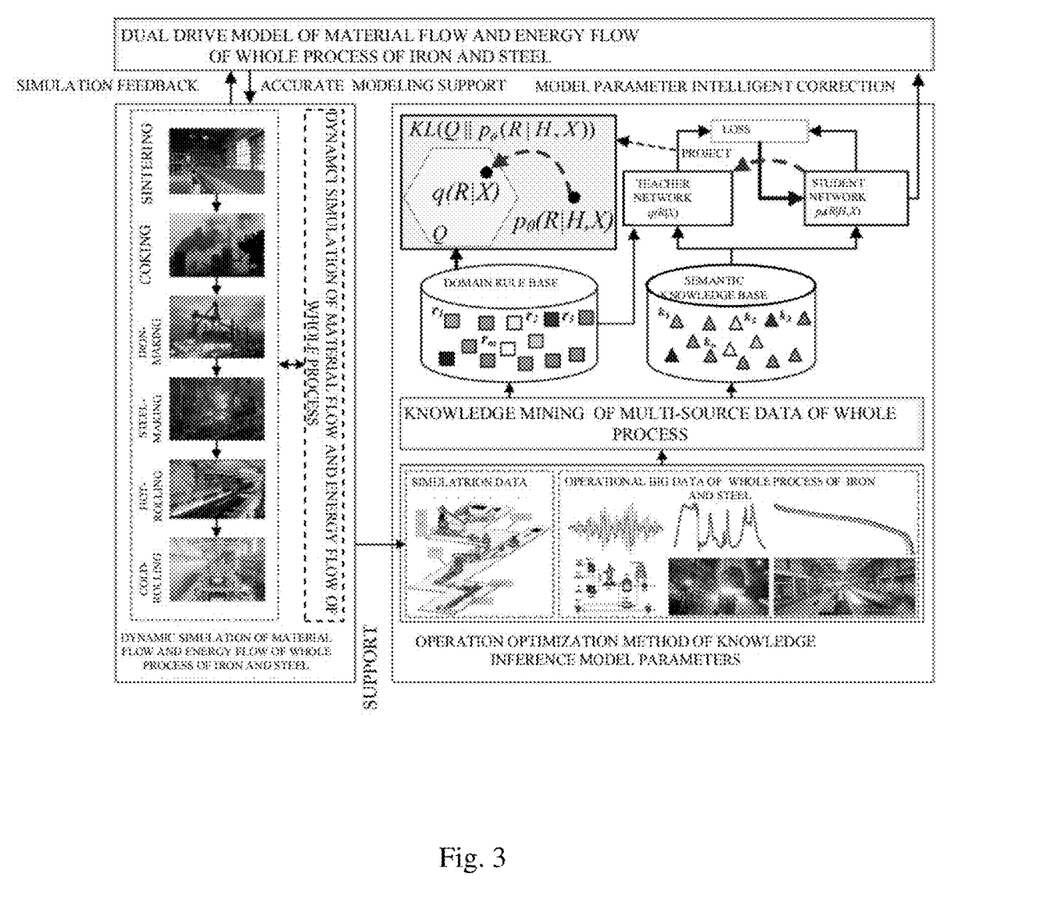
FIG. 3 is a block diagram illustrating an optimization decision-making structure of parameter intelligent correction for a dual drive model of material flow and energy flow of a whole process of iron and steel according to an exemplary embodiment.

The energy flow network of iron and steel industry is a complex and huge system. The energy flow network is in a dynamic state in the production process and is in coupling correlation with the material flow. The built model of the material flow and the energy flow of a whole process is required to be dynamically self-adaptive to meet actual needs. The operational big data of the whole process of the iron and steel contains the dynamic variation laws of the material flow and the energy flow, while the dynamic simulation of virtual data of the whole process may reflect the evolution characteristics of physical entities. The method of accurately modeling the material flow and the energy flow of the whole process of the iron and steel by fusing knowledge learning is provided herein, which mines the innovative knowledge implied by the operational big data of the whole process of the iron and steel, forms the domain rule knowledge base and the semantic knowledge base, builds the optimization decision-making knowledge inference model embedded with the domain rule knowledge based on the domain rule knowledge base and the semantic knowledge base, and intelligently corrects the built dual drive model of the material flow and the energy flow of the whole process of the iron and steel, so as to realize the dynamic self-adaptation of the model and improve the accuracy of the model. FIG. 3 shows the basic framework of the optimization decision-making structure.

FIG. 3 mainly includes 3 parts: the dual drive model of the material flow and the energy flow of the whole process of the iron and steel, an operation optimization method based on knowledge inference model parameters and the dynamic simulation of the material flow and the energy flow of the whole process of the iron and steel. Among these 3 parts, the dual drive model of the material flow and the energy flow of the whole process of the iron and steel is specific to network nodes of the material flow and the energy flow of the whole process of the iron and steel and builds a dual drive model for mechanism and data so as to solve limitations caused by using mechanism model or data model separately and enhance robustness and accuracy of the model. The module of the operation optimization method based on knowledge inference model parameters solves the problem of parameter dynamic evolution of the dual drive model. Since the process of the iron and steel features in nonlinearity, strong coupling of variables and space-and-time complexity, the built dual drive model also requires constant adjustment of the model parameters so as to adapt to the accuracy of the actual production process model. The module of the dynamic simulation of the material flow and the energy flow of the whole process of the iron and steel verifies the reliability of the dual drive model of the material flow and the energy flow of the whole process of the iron and steel, and provides simulation data support to the module of the operation optimization method based on knowledge inference model parameters.

Hereinafter, the 3 parts mentioned above will be described in detail, respectively.

(1) The dual drive model of the material flow and the energy flow of the whole process of the iron and steel The dual drive model of the material flow and the energy flow of the whole process of the iron and steel mainly performs fusing of mechanism model and data model of the material flow and the energy flow of the whole process of the iron and steel by means of a certain method so as to form complementary advantages of the mechanism model and the data model, thereby enhance the accuracy of modeling. Since the material flow and the energy flow have complex structures during the production process of the iron and steel and there are characteristics such as multi-dimensional correlation, multi-field cooperation, multi-phase coupling, and the like between the material flow and the energy flow, the accurately built fusing model is the foundation of achieving collaborative optimization of production operation of the iron and steel. On one hand, in the invention, a network modeling method of "node-connector" is utilized to construct equipment, units, processes, and the like involved by the material flow into "nodes" of different scales, and to construct pipings, hot-metal tanks, ladles, and the like involved by the energy flow into "connectors" so as to form a mechanism model with coupling network of the material flow and the energy flow. On the other hand, semantic features of multi-source heterogeneous space-and-time data of the production process are extracted and mapping mechanism of the semantic features of the material flow and the energy flow is explored to build the data model. Finally, the mechanism model and the data model of the material flow and the energy flow of the whole process of the iron and steel are fused to form the dual drive model $f_{mechanism\text{-}data\text{-}driven}$ (X;θ), where θ is the model parameter.

(2) The operation optimization method based on knowledge inference model parameters The manufacturing process environment of the iron and steel is complex, and the built model is continuously changing. With the method provided by the invention, the parameter θ of the dual drive model $f_{mechanism\text{-}data\text{-}driven}$ (X;θ) of the material flow and the energy flow of the whole process of the iron and steel is intelligently corrected. Firstly, the operational big data of the whole process of the iron and steel and the simulation data of the dynamic simulation module of the material flow and the energy flow of the whole process of the iron and steel are mined for knowledge so as to form the domain rule knowledge base and the semantic knowledge base.

The representation of the domain rule is as shown follows:

∀$D_1, D_2, \ldots, D_l$.$P_1(D_1, \ldots )$∧$P_2(D_2, \ldots )$∧ $\ldots$ ∧$P_l$($D_l, \ldots$)⇒$P_R$(Q,R):λ, where $P_1$, $P_2$, $P_l$, $P_R$ are predicates; $D_1$, $D_2$, $D_l$, R are variables; λ represents the weight. The weight indicates an importance of the first-order logic rule. That is, the larger the weight, the more important the first-order logic rule is. The specific value of the weight is a non-negative real number. Such rule indicates that the states of industrial process targets $D_1, D_2, \ldots, D_l$ in a certain condition cause the result of the optimization decision-making problem Q is R.

The representation of the semantic knowledge is shown as follows:

k=($H_1, H_2, \ldots, H_N$):{$A_1, A_2, \ldots, A_N$}:R, where the first half is the fusing feature $h_A$ $h_A$=($H_1$, $H_2, \ldots, H_N$):{$A_1, A_2, \ldots, A_N$}; and R is decision making semantics corresponding to the fusing feature $h_A$, and R generally represents a specific decision-making result of a certain decision-making problem.

The domain rule knowledge base KR and the semantic knowledge base KS are built from the above, and optimization decision-making knowledge inference model embedded with the domain rule knowledge is shown as follows:

$$q^*(R|X) = \frac{1}{Z} p_\theta(R|H, X) \exp\left\{C \sum_i \lambda_i \phi_i(X, Y)\right\}$$

$$Z = \sum_Y p_\theta(R|H, X) \exp\left\{C \sum_i \lambda_i \phi_i(X, Y)\right\}$$

$q^*(R|X)$ represents the optimization decision-making mode embedded with the domain rule knowledge which is used as the teacher network; $p_\theta(R|H,X)$ is the optimization decision-making model driven by the multi-source data semantic knowledge, which is used as the student network; and $\phi_i$: $\{r_{i,l}(X,Y)\}_{l=1}^{L} \to \mathbb{R}$ is a mapping function of the constraints of the domain rule.

The parameter of the dual drive model of the material flow and the energy flow of the whole process of the iron and steel is the optimization decision-making problem of the invention, and the nature of this problem is a regression problem. The student network $p_\theta(R|H,X)$ chooses LSTM model. From this, the optimization decision-making knowledge inference model for the parameter of the dual drive model of the material flow and the energy flow of the whole process of the iron and steel is obtained so as to intelligently correct the model parameter in real time.

(3) The dynamic simulation of the material flow and the energy flow of the whole process of the iron and steel The whole process, such as sintering, coking, iron-making, steel-making, hot-rolling and cold-rolling, of the iron and steel is modelled by utilizing the built dual drive model of the material flow and the energy flow of the whole process of the iron and steel to establish the dynamic simulation system and performs dynamic interactive iteration mapping with the actual production process, and a digital twin system of the material flow and the energy flow of the whole process of the iron and steel is formed. The dynamic simulation data generated by the digital twin system supports the operation optimization of the knowledge inference model parameters as a data source.

In the invention, it should be noted that relational terms such as "first" and "second" are only used to distinguish one entity or operation from another entity or operation, and do not necessarily require or imply any such actual correlation or sequence between these entities or operations. Further, terms "include", "comprise" or any other variation thereof are intended to cover non-exclusive inclusion, such that a process, method, article, or device that includes a series of elements includes not only those elements, but also other elements that are not explicitly listed, or elements inherent for such process, method, article, or device. Without further limitations, the elements defined by the statement "including a..." do not exclude the existence of other same elements in the process, method, article or device including the elements.

The above is only the specific embodiments of the invention, which enables persons skilled in the art to understand or realize the invention. Various modifications to these embodiments will be apparent to persons skilled in the art, and the general principles defined herein can be implemented in other embodiments without departing from the spirit or scope of the invention. Hence, the present disclosure will not be limited to these embodiments shown herein, but will conform to the widest scope consistent with the principles and novel features applied herein.

What is claimed is:

1. An optimization decision-making method of an industrial process fusing domain knowledge and multi-source data, comprising:
   S1: acquiring the domain knowledge of the industrial process by using probability soft logic, and building a domain rule knowledge base of the industrial process, wherein a specific expression form of the domain rule knowledge base of the industrial process is $K_R$ $\{(r_i, \lambda_i)\}^m_{i=1}$, wherein m represents a size of the domain rule knowledge base, $r_i$ represents an i-th first-order logic rule, and $\lambda_i$ is weight of a corresponding first-order logic rule;
   S2: fusing multi-source data semantics and multi-source data features to form a new semantic knowledge representation of the industrial process, and constructing a semantic knowledge base of the industrial process, wherein a step of acquiring the multi-source data semantics comprises:

S21: clustering the multi-source data by an unsupervised clustering method to extract the multi-source data semantics; and wherein a step of acquiring the multi-source data features comprises:

S22: preforming feature extraction on the multi-source data by using a convolution self-encoder;

S3: under a posteriori regularization framework, utilizing the domain rule knowledge base of the industrial process and the semantic knowledge base of the industrial process to obtain an optimization decision-making model embedded with domain rule knowledge and obtain a posteriori distribution model, wherein specific steps of obtaining the optimization decision-making model embedded with the domain rule knowledge and obtaining the posteriori distribution model comprise:

S31: defining a mapping relation $\phi_i: \{r_{i,l}(X,Y)\}_{l=1}^{L} \to R$ by using the domain rule knowledge base $K_R = \{(r_i, \lambda_i)\}_{i=1}^{m}$ of the industrial process to encode the domain knowledge of the industrial process;

S32: under a posteriori regularization framework, introducing $\phi_i: \{r_{i,l}(X,Y)\}_{l=1}^{L} \to R$ in form of constraints into a learning process of the model, converting an optimization decision-making problem thereof into a constraint-optimization problem, $$\min_{q \in Q, \xi \geq 0} f(X, Y) - C \sum_i \xi_i$$

$$\text{s.t. } \lambda_i E_q[\phi_i(X, Y)] \leq \xi_i, i = 1, \ldots, m$$

Wherein C, $\lambda_i$ and $\xi_i$ are constants;

$KL(q(Y|X) \| p_\theta(Y|X))$ under the posteriori regularization framework; and $KL(\cdot)$ is a divergence calculation; and S33: obtaining an optimization decision-making knowledge inference model embedded with the domain rule knowledge of the industrial process by solving the constraint-optimization problem:

$$q(Y|X) = \frac{1}{Z} p_\theta(Y|X) \exp\left\{C \sum_i \lambda_i \phi_i(X, Y)\right\}$$

$$Z = \sum_Y p_\theta(Y|X) \exp\left\{C \sum_i \lambda_i \phi_i(X, Y)\right\}$$

wherein q(Y|X) represents the optimization decision-making model embedded with the domain rule knowledge, and $P_\theta(Y|X)$ is the posteriori distribution model; and S4: migrating knowledge in the optimization decision-making model embedded with the domain rule knowledge into the posteriori distribution model through knowledge distillation technology.

2. The optimization decision-making method of the industrial process fusing the domain knowledge and the multi-source data of claim 1, wherein specific steps of acquiring the domain knowledge of the industrial process by using the probability soft logic comprises:

S11: expressing properties, states, attributes and correlations there between different production factors in a manufacturing process by using an N-ary predicate so as to construct a first-order logic rule;

S12: defining a weighted first-order logic rule to express a relationship between the optimization decision-making problem and a cause of the optimization decision-making problem; and S13: performing weight learning by using the probability soft logic to acquire the domain rule knowledge of the industrial process.

3. The optimization decision-making method of the industrial process fusing the domain knowledge and the multi-source data of claim 2, wherein a specific formula of the weighted first-order logic rule is $\forall D_1, D_2, \ldots, D_l, R.P_1(D_1, \ldots) \wedge P_2(D_2, \ldots) \wedge \ldots \wedge P_l(D_l, \ldots) \Rightarrow P_R(Q,R): \lambda$ wherein $P_1, P_2, P_l, P_R$ are predicates; $D_1, D_2, D_l, R$ are variables; $\lambda$ represents the weight which indicates an importance of the first-order logic rule, and larger the weight, more important the first-order logic rule is; a specific value of the weight is a non-negative real number; such rule indicates that states of industrial process targets $D_1, D_2, \ldots, D_l$ in a certain condition cause a result of the optimization decision-making problem Q is R.

4. The optimization decision-making method of the industrial process fusing the domain knowledge and the multi-source data of claim 1, wherein a specific form of the new semantic knowledge representation of the industrial process is wherein a first half is a fusing feature $h_A$ and $h_A = (H_1, H_2, \ldots, H_N): \{A_1, A_2, \ldots A_N\}$; and R is decision-making semantics corresponding to the fusing feature $h_A$, and R represents a specific decision-making result of the optimization decision-making problem;

$(H_1, H_2, \ldots, H_N)$ is a feature of compact optimization for the multi-source data $(X_1, X_2, \ldots, X_N)$; and $\{A_1, A_2, \ldots, A_N\}$ is semantics of the multi-source data $(X_1, X_2, \ldots, X_N)$.

5. The optimization decision-making method of the industrial process fusing the domain knowledge and the multi-source data of claim 1, wherein a specific expression form of the semantic knowledge base of the industrial process is $K_S = \{k_i\}_{i=1}^{n}$, wherein n represents a size of the semantic knowledge base, and $k_i$ represents an i-th knowledge element.

6. The optimization decision-making method of the industrial process fusing the domain knowledge and the multi-source data of claim 1, wherein specific steps of migrating knowledge in the optimization decision-making model embedded with the domain rule knowledge into the posteriori distribution model comprises:

S41: defining the optimization decision-making model q(Y|X) embedded with the domain rule knowledge as a teacher network, and defining the posteriori distribution model $p_{74}(Y|X)$ established by the multi-source data semantics as a student network;

S42: training the teacher network and the student network simultaneously by using the domain rule knowledge base $K_R$ of the industrial process and the semantic knowledge base $K_S$ of the industrial process, wherein a parameter $\theta$ is updated as follows:

$$\theta^{t+1} = \operatorname*{argmin}_{\theta \in \Theta} \frac{1}{n} \sum_{i=1}^{n} [(1-\pi) \operatorname{loss}(c_R^i, \sigma_\theta) + \pi \operatorname{loss}(s_i^i, \sigma_\theta)]$$

wherein loss(•) is a loss function; $\sigma_\theta$ is a soft output of the student network $p_\theta(Y|X)$; $S_i^t$ is a soft output of the teacher network $q(Y|X)$; and $C_R^i$; is a real decision-making semantics; and performing iteration training of a teacher-student network by using formulas $$q(Y|X) = \frac{1}{Z} p_\theta(Y|X) \exp\left\{C \sum_i \lambda_i \phi_i(X, Y)\right\}$$

$$Z = \sum_Y p_\theta(Y|X) \exp\left\{C \sum_i \lambda_i \phi_i(X, Y)\right\}$$

and $$\theta^{t+1} = \underset{\theta \in \Theta}{\operatorname{argmin}} \frac{1}{n} \sum_{i=1}^{n} [(1-\pi) \operatorname{loss}(c_R^i, \sigma_\theta) + \pi \operatorname{loss}(s_i^t, \sigma_\theta)]$$

so as to migrate knowledge from the teacher network to the student network.

7. The optimization decision-making method of the industrial process fusing the domain knowledge and the multi-source data of claim 6, wherein a specific form of the loss function loss(•) is as follows:

when solving a classification problem, the loss function of a cross-entropy $$\operatorname{loss}(y, \hat{y}) = -\frac{1}{n} \sum_{i=1}^{n} [y \ln \hat{y} + (1-y) \ln(1-\hat{y})]$$

is chosen,
wherein y is a real value, and $\hat{y}$ is a prediction value; and
when solving a regression problem, the loss function of square $$\operatorname{loss}(y, \hat{y}) = \frac{1}{2n} \sum_{i=1}^{n} \|(y - \hat{y})\|_2^2$$

is chosen,
wherein y is a real value, and $\hat{y}$ is a prediction value.

* * * * *